(12) United States Patent
Ohara

(10) Patent No.: US 9,051,879 B2
(45) Date of Patent: *Jun. 9, 2015

(54) THERMAL BARRIER COATING METHOD, MASKING PIN AND COMBUSTOR TRANSITION PIECE

(71) Applicant: MITSUBISHI HEAVY INDUSTRIES, LTD., Tokyo (JP)

(72) Inventor: Minoru Ohara, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,662

(22) Filed: Jul. 8, 2013

(65) Prior Publication Data

US 2014/0023787 A1    Jan. 23, 2014

Related U.S. Application Data

(60) Continuation of application No. 13/206,916, filed on Aug. 10, 2011, now Pat. No. 8,722,144, which is a division of application No. 10/500,961, filed as application No. PCT/JP03/01078 on Feb. 3, 2003, now abandoned.

(30) Foreign Application Priority Data

Aug. 2, 2002 (JP) ................................ 2002-225863

(51) Int. Cl.
F02C 7/12 (2006.01)
C23C 4/00 (2006.01)
C23C 4/02 (2006.01)

(52) U.S. Cl.
CPC ............. *F02C 7/12* (2013.01); *Y10T 29/49318* (2015.01); *Y10T 428/24802* (2015.01); *C23C 4/005* (2013.01); *C23C 4/02* (2013.01); *Y02T 50/67* (2013.01)

(58) Field of Classification Search
USPC .......................... 427/282, 300, 142, 287, 272
See application file for complete search history.

(56) References Cited

U.S. PATENT DOCUMENTS 2,709,161 A   5/1955   Kilbourne, Jr. et al.
3,667,988 A   6/1972   Horiki
(Continued)

FOREIGN PATENT DOCUMENTS

EP   0 510 740 A1   10/1992
EP   0803900        10/1997
(Continued)

OTHER PUBLICATIONS

GE Silicones, RTV 11, Technical Data Sheet, pp. 1-5, no date.*
(Continued)

*Primary Examiner* — Nathan T Leong
(74) *Attorney, Agent, or Firm* — Wenderoth, Lind & Ponack, L.L.P.

(57) ABSTRACT

A thermal barrier coating method forms a thermal barrier coating by spray coating over the surface of a component where cooling holes are made. The thermal barrier coating is formed by spray coating after masking pins, which do not protrude above the surface of the component, are inserted into the cooling holes or masking pins protruding above the surface of the component are inserted and get shrunk due to heat while spray coating, obtaining the protruding amount equal to or less than the thickness of the thermal barrier coating after shrinkage, which characterizes the method. By way of this method, a thermal barrier coating can be formed all over the surface without clogging the cooling holes.

12 Claims, 12 Drawing Sheets

(56) References Cited

U.S. PATENT DOCUMENTS

| | | | |
|---|---|---|---|
| 4,411,856 A | 10/1983 | Montierth | |
| 4,634,623 A | 1/1987 | Watkins | |
| 5,130,163 A | 7/1992 | Clingman et al. | |
| 5,322,727 A | 6/1994 | Yankus et al. | |
| 5,705,115 A * | 1/1998 | Haruno | 264/321 |
| 5,800,695 A | 9/1998 | Kang et al. | |
| 5,902,647 A | 5/1999 | Venkataramani et al. | |
| 5,985,122 A | 11/1999 | Conner | |
| 6,096,381 A | 8/2000 | Zheng | |
| 6,190,785 B1 | 2/2001 | Yonezawa et al. | |
| 6,242,050 B1 | 6/2001 | Ritter et al. | |
| 6,265,022 B1 | 7/2001 | Fernihough et al. | |
| 6,306,517 B1 * | 10/2001 | Gray et al. | 428/469 |
| 6,358,615 B1 | 3/2002 | Imai | |
| 6,380,512 B1 | 4/2002 | Emer | |
| 6,573,474 B1 | 6/2003 | Loringer | |
| 2002/0009609 A1 | 1/2002 | Ritter et al. | |

FOREIGN PATENT DOCUMENTS

| | | |
|---|---|---|
| EP | 0 843 026 A1 | 5/1998 |
| EP | 0 851 098 A2 | 7/1998 |
| EP | 1 016 735 A1 | 7/2000 |
| EP | 1 076 106 A1 | 2/2001 |
| EP | 1 076 107 A1 | 2/2001 |
| EP | 1 076 727 B1 | 2/2001 |
| JP | 48-29532 | 9/1973 |
| JP | 63-130157 | 8/1988 |
| JP | 63-201685 | 12/1988 |
| JP | 2-129281 | 10/1990 |
| JP | 4-236757 | 8/1992 |
| JP | 04-362168 | 12/1992 |
| JP | 05-115841 | 5/1993 |
| JP | 8-503496 | 4/1996 |
| JP | 8-257835 | 10/1996 |
| JP | 10-50812 | 2/1998 |
| JP | 11-229161 | 8/1999 |
| JP | 2000-273613 | 10/2000 |
| JP | 2001-349201 | 12/2001 |
| JP | 2003-90229 | 3/2003 |
| JP | 2003-342707 | 12/2003 |
| WO | 94/09079 | 4/1994 |

OTHER PUBLICATIONS

Translation of German Patent Office Notice of Opposition (DE 10392994) dated Jan. 8, 2007.

Translation of German Patent Office Missing Parts (DE 10392994) dated Jan. 8, 2007.

Japanese Office Action (with English translation thereof) issued May 17, 2007 in Japanese Application No. 2004-525769, which is a foreign counterpart of the present application.

International Search Report issued Mar. 11, 2003 in International Application No. PCT/JP03/01078.

* cited by examiner

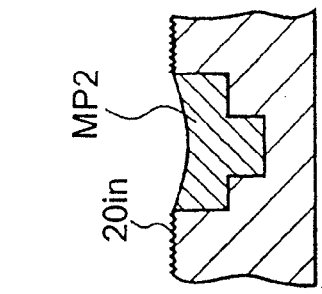
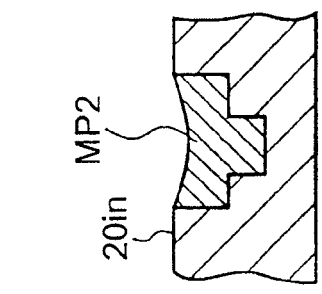
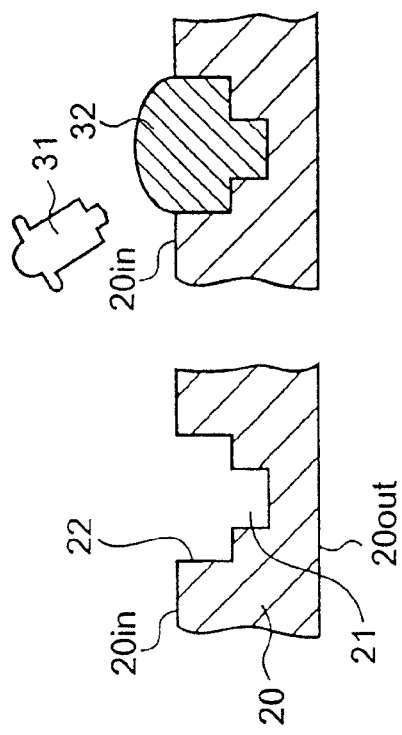
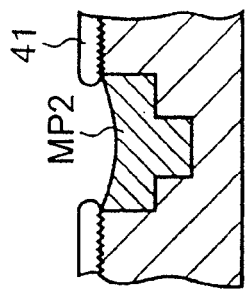
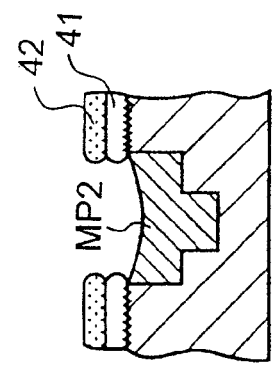
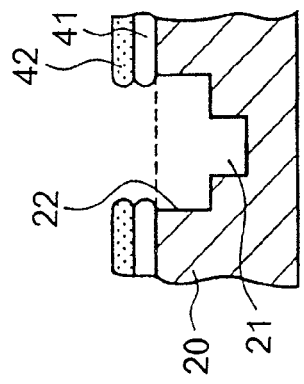

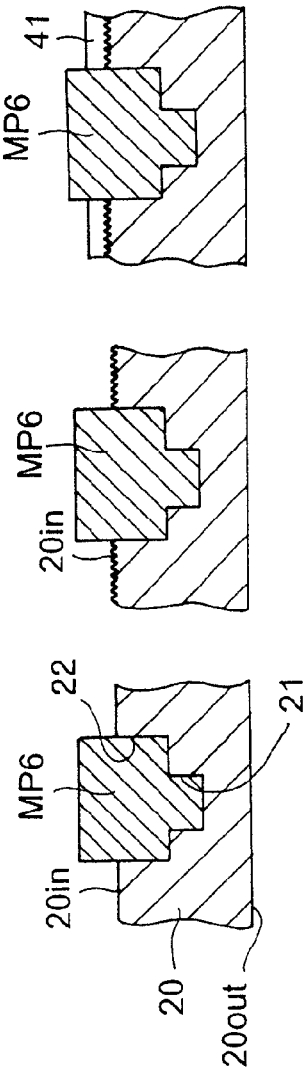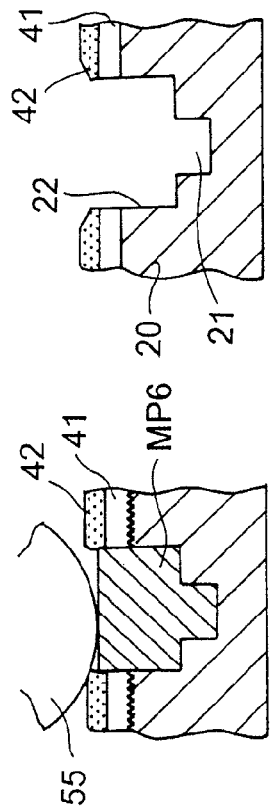

THERMAL BARRIER COATING METHOD, MASKING PIN AND COMBUSTOR TRANSITION PIECE

TECHNICAL FIELD

The present invention relates to a thermal barrier coating method, masking pin and a transition piece of a combustor and it is invented to provide a thermal barrier coating to all surfaces requiring thermal shield, without clogging cooling holes and to carry out thermal barrier coating practices easily.

DESCRIPTION OF ART

FIG. 3 shows an arrangement of a combustor 100 of a gas turbine. The combustor 100 consists of fuel nozzles 101, a combustor basket 102 and a combustor transition piece 103. Fuel F and compressed air PA discharged from a compressor 104 are supplied to the fuel nozzles 101, premixed gas which is a mixture of the fuel F and the compressed air PA is ejected into the combustor basket 102 from the fuel nozzles 101 and burned, generating combustion gas CG of high temperature and high pressure. The combustion gas CG acts on a rotating blade 106 and rotates the rotating blade 106 after it is guided by the combustor transition piece 103 and its flow rate and flow direction are controlled by a stationary vane 105. A part of the compressed air PA flows through a bypass valve 107, where air amount is regulated, and is supplied into the combustor transition piece 103. A component indicated with number 108 is a casing.

The combustor transition piece 103 is a cylinder which leads the combustion gas CG to blades and shaped to be circular at the inlet side (i.e. the side of the combustor basket 102) but rectangular at the outlet side (i.e. the side of the stationary vane 105). In order to cool this combustor transition piece 103, air-cooled construction is adopted for the combustor transition piece 103. The air-cooled construction which is adopted for the combustor transition piece 103 is to be described herein by referring to FIG. 4 which shows a partial cut-away view of the combustion transition piece 103, FIG. 5 which is a cross section of FIG. 4 viewed from a direction A and FIG. 6 which is a cross section of FIG. 4 viewed from a direction B.

As shown in FIG. 4 through FIG. 6, a wall constituting the combustion transition piece 103 is of double wall construction which combines an outside plate 2 including air passageway slots 1 and an inside plate 3 together. Namely, an exterior wall on the outside diameter of the combustion transition piece 103 is the outside plate 2 and an internal wall on the inside diameter is the inside plate 3, and inside the wall of the combustor transition piece 103, a plurality of air passageway slots 1 are formed, extending in a direction of the combustion gas CG flow. Furthermore, air inlet holes 4 leading to the air passageway slots 1 are formed in the outside plate 2 and air outlet holes 5 leading to the air passageway slots 1 are made in the inside plate 3. Diameters of the holes 4 and 5 are larger than the width of the air passageway slots 1. Additionally, the position of the air inlet holes 4 drifts from that of the air outlet holes 5 and a multiple number of the air inlet holes 4 and the air outlet holes 5 are formed in a dispersed manner in a pattern of a hound's-tooth check or in a grid pattern.

As a result, the compressed air PA discharged from the compressor 104 (See FIG. 3.) becomes cooling air and this cooling air goes into the air passageway slots 1 through the air inlet holes 4, flows through the air passageway slots 1 and cools the wall of the combustor transition piece 103. This cooling air is exhausted through the air outlet holes 5 into a space inside the combustor transition piece 103.

In this way, a multiple number (e.g. approximately 600 through 800 pieces) of the air outlet holes (cooling holes) 5 are formed in the internal periphery surface of the combustor transition piece 103. On this internal periphery surface of the combustor transition piece 103, thermal barrier coating (TBC) is provided. Prior to implementation of this thermal barrier coating (TBC) supply, it is necessary to mask the air outlet holes 5 in order to prevent them from clogging due to coating.

A procedure for supplying a thermal barrier coating to the internal periphery surface of the combustor transition piece 103 is as follows:

(i) First, mask the air outlet holes (cooling holes) 5 in the internal periphery surface of the transition piece by using masking materials. A current masking method will be described hereinafter.

(ii) Next, supply the internal periphery surface of the transition piece with blast treatment to coarsen the internal periphery surface of the transition piece.

(iii) Form a surface metal layer (undercoat) on the coarsened internal periphery surface by spray coating.

(iv) Form a thermal barrier layer (top coat) over the surface metal layer by plasma spray coating with ceramics mainly composed of zirconia (v) Remove masking materials.

In one example of conventional masking methods, as indicated in FIG. 7 showing the internal periphery surface of the combustor transition piece 103, a masking tape 10 is attached to a region in a shape of belt where cooling holes 5 are in a line and a thermal barrier coating is formed by spray coating. Then, after the coating is formed, the masking tape 10 will be peeled off. Therefore, as shown in FIG. 8, a thermal barrier coating is not formed in the belt-shaped region 11 after the masking tape 10 is peeled off. In addition, using masking tapes takes a time because two kinds of masking tapes, one for blasting and the other for coating, are attached and peeled off.

Also, in another example of conventional masking methods, as shown in FIG. 9, a masking pin MP 1 is inserted into a cooling hole 5 formed in the internal periphery surface (inside plate 3) of the combustor transition piece 103 and a thermal barrier coating is formed by spray coating. The masking pin MP 1 is cylindrical and made by punching out a plurality of piled up masking tapes (vinyl tapes) by use of a cylindrical mold and it protrudes over the surface on the inside diameter of the combustor transition piece 103 (the surface of the inside plate 3).

In the example shown in FIG. 9, since spray-coating angle α exists in spray coating, protruded masking pin MP 1 shadows a region β and in this shadowed region β, no thermal barrier coating is formed. Additionally, when the masking pin MP 1 is pulled out after a thermal barrier coating is formed, bridging portion in black B of the thermal barrier coating is peeled off together with the masking pin MP 1 and no thermal barrier coating is formed in this portion, either.

As mentioned above, since conventional technologies shown in FIG. 7 and FIG. 8 use a masking tape 10 for masking, no thermal barrier coating is formed in a wide belt-shaped region 11. When a gas turbine is in use for a long period, the region 11 of the combustor transition piece 103 where no thermal barrier coating is formed is subject to oxidation and thinning due to the absence of a surface metal layer (oxidation resistance layer), cracking due to an increase in metal temperature and damages due to growth of cracking, which has been a problem.

Additionally, in conventional technology indicated in FIG. 9, since no thermal barrier coating is formed in shadowed region β and in the region where the bridging portion B is peeled off, similarly, portions where no thermal barrier coating is formed are subject to cracking due to an increase in metal temperature and damages due to growth of cracking, which has also been a problem. In addition, masking pin MP 1 composed of vinyl masking tapes piled up is sometimes seized in the cooling hole 5 and it takes time to remove the masking pin MP 1.

The masking pin MP 1 is protruded above the internal periphery surface of the combustor transition piece 103 (surface of the inside plate 3), as a result of consideration for making it easier to remove the masking pin MP 1 even though the masking pin MP 1 is burned and scorched during spray coating, resulting in reducing its height.

It was considered to insert a masking pin of black lead rod or polyethylene-insulated copper wire, both of which are current masking materials, into the cooling hole 5. However, even though a plug (masking pin) of black lead rod or polyethylene-insulated copper wire, both of which are current masking materials, is inserted into the cooling hole 5, a current plug comes off in the midway of treatment because the cooling hole 5 is not drilled through and is about 1 mm deep and shallow; or on the other hand, it gets seized in the hole and the masking pin cannot be taken out after a thermal barrier coating is formed. Additionally, no heat treatment is performed for combustor transition pieces after forming a thermal barrier coating, the masking pin cannot be burned down by heat treatment.

SUMMARY OF THE INVENTION

It is an object of the present invention to provide a thermal barrier coating method, a masking pin and a combustor transition piece that can form a thermal barrier coating all over the surface without clogging cooling holes when a thermal barrier coating is formed by spray coating over the surface of a component where cooling holes are made (e.g. the internal periphery surface of combustor transition piece).

To solve the above-mentioned problem, a thermal barrier coating method in accordance with the present invention is a method of forming a thermal barrier coating by spray coating over the surface of a component where cooling holes are made. It is characterized by forming a thermal barrier coating by spray coating after masking pins which do not protrude above the surface of the component are inserted into the cooling holes.

In accordance with the present invention, a thermal barrier coating is formed by spray coating over the surface of a component where cooling holes are made. This method is characterized by including a masking process where masking pins which do not protrude above the surface of the component are inserted into the cooling holes; a blasting treatment process in which the surface of the component is blasted to be coarsened; and a thermal barrier coating process in which a thermal barrier coating is formed by spray coating over the surface of coarsened component.

In accordance with the present invention, a thermal barrier coating is formed by spray coating over the surface of a component where cooling holes are made. This method is characterized by forming a thermal barrier coating by spray coating after masking pins protruding above the surface of the component for an amount nearly as much as the thickness of a thermal barrier coating are inserted into the cooling holes.

In accordance with the present invention, a thermal barrier coating is formed by spray coating over the surface of a component where cooling holes are made. This method is characterized by including a masking process in which masking pins protruding above the surface of the component for an amount nearly as much as the thickness of a thermal barrier coating are inserted into the cooling holes; a blasting treatment process in which the surface of the component is blasted to be coarsened; a thermal barrier coating process in which a thermal barrier coating is formed by spray coating over the surface of blasted component; and a chamfering process in which the thermal barrier coating around the cooling holes is chamfered.

In accordance with the present invention, a thermal barrier coating is formed by spray coating over the surface of a component where cooling holes are made. This method is characterized by that in forming a thermal barrier coating by spray coating over the surface of a component where cooling holes are made after insertion of masking pins protruding above the surface of the component into the cooling holes, the protruding mount of the masking pins will be reduced to be equal to or less than the thickness of a thermal barrier coating after the masking pins are shrunk by heat of spray coating.

In accordance with the present invention, a thermal barrier coating is formed by spray coating over the surface of a component where cooling holes are made. This method is characterized by a masking process where masking pins which protrude above the surface of the component and get shrunk by heat of spray coating to make the protruding amount equal to or less than the thickness of a thermal barrier coating, into cooling holes; a blasting process in which the surface of the component is blasted and coarsened; a thermal barrier coating process in which a thermal barrier coating is formed on the coarsened surface of the component by spray coating; and a chamfering process in which a thermal barrier coating around the cooling holes is chamfered.

In accordance with the present invention, the cooling holes are not drilled through or drilled through. The component is a combustor transition piece of a gas turbine and the cooling holes are characterized by being formed in the internal periphery surface of a wall constituting the combustor transition piece.

In accordance with the present invention, the masking pin is composed of a material which has elasticity for superior blasting resistance, heat resistance enduring heat caused by spray heating, easy stripping ability to entirely detach from the cooling hole after a thermal barrier coating is formed, superior adherence ability and wetness to prevent accumulation of a thermal barrier coating material. The masking pin is composed of elastic body of silicone rubber. The masking pin is made by drying and hardening elastic body of liquid silicone rubber injected into the cooling hole or punching out of sheets of elastic body of silicone rubber with a mold or by forming with a metal mold.

In accordance with the present invention, the masking pin is composed of a material which has elasticity for superior blasting resistance, heat resistance against heat caused by spray heating, stripping easiness to entirely detach from the cooling hole after thermal barrier coating is formed, superior adherence ability and wetness to prevent accumulation of a thermal barrier coating material. The masking pin made by drying and hardening elastic body of liquid silicone rubber injected into the cooling hole or punching out of sheets of elastic body of silicone rubber with a mold or by forming with a metal mold. The outside diameter of the masking pin is enlarged for about 10% larger than the diameter of the cooling hole.

In accordance with the present invention, a combustor transition piece is characterized by a thermal barrier coating formed on the internal periphery surface by the above-mentioned thermal barrier coating method.

BRIEF DESCRIPTION OF THE DRAWINGS

FIGS. 1A to 1G are illustrations showing a thermal barrier coating method in accordance with an embodiment of the prevent invention, using masking pins of elastic body of liquid silicone rubber. In particular, FIG. 1A shows a process of applying stripping agents to a cooling hole 22 and to a portion of an air passageway slot 21 facing to the cooling hole 22. FIG. 1B shows a process of injecting an elastic body of liquid silicone rubber 32 into the cooling hole 22 and into the portion of the air passageway slot 21 facing to the cooling hole 22. FIG. 1C shows a state where the injected elastic body of liquid silicone rubber 32 becomes a masking pin MP2. FIG. 1D shows a process of carrying out blast treatment for an internal periphery surface 20in. FIG. 1E shows a process of forming a surface metal layer (undercoat) 41 over the internal periphery surface 20in. FIG. 1F shows a process of forming a thermal barrier layer (topcoat) 42 over the surface metal layer 41. FIG. 1G shows a process of taking the masking pin MP2 out of the cooling hole 22.

FIG. 2A shows a state where a masking pin MP3 having a flat plate or a footed type sectional configuration is inserted into a cooling hole 22. FIG. 2B shoes a state where a masking pin MP4 having a tapered sectional configuration is inserted into a cooling hole 22.

FIG. 10A shows the front view of the disc type making pin, and FIG. 10B shows the bottom view of the disc type masking pin.

FIG. 11A shows the front view of the disc type footed masking pin, and FIG. 11B shows the bottom view of the disc type footed masking pin.

FIG. 12A shows the front view of the disc type footed masking pin around which the protrusions are supplied, and FIG. 12B shows the bottom view of the disc type footed masking pin around which the protrusions are supplied.

FIGS. 13A to 13F are illustrations showing another example of a thermal barrier coating method in accordance with the embodiment of the present invention, using a masking pin which is formed by punching out of sheets of elastic body of silicone rubber with a mold or forming with a metal mold. In particular, FIG. 13A shows a process of inserting a masking pin MP6 into a cooling hole 22 and a portion of an air passageway slot 21 facing to the cooling hole 22. FIG. 13B shows a process of blasting an internal periphery surface 20in to be coarsened. FIG. 13C shows a process of forming a surface metal layer (undercoat) 41 on the internal periphery surface 20in. FIG. 13D shows a process of forming a thermal barrier layer (topcoat) 42. FIG. 13E shows a process of chamfering a circumference of the coated hole with a rubber ball hone 55. FIG. 13F shows a process of taking the masking pin MP6 out of the cooling hole 22.

DETAILED DESCRIPTION OF THE INVENTION

Figure 2A:
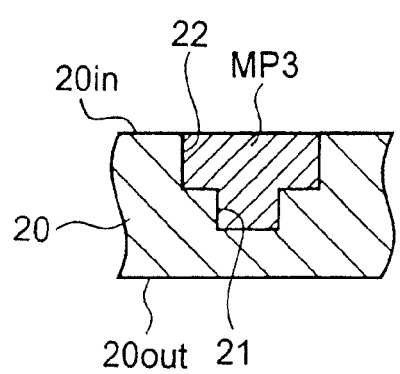
FIGS. 2A and 2B are illustrations showing a thermal barrier coating method in accordance with the embodiment of the present invention, using masking pins which are formed by punching out of sheets of elastic body of silicone rubber with a mold or by forming with a metal mold. In particular.

Referring now to the drawings, an embodiment of the present invention will be described hereinafter. In the embodiment of the present invention, when a thermal barrier coating is formed by spray coating over the internal periphery surface of a combustor transition piece of a gas turbine, a masking pin is inserted into a cooling hole made in the internal periphery surface of the combustor transition piece.

The masking pin is composed of an elastic body of rubber having the following material properties (1) through (4):

(1) Heat resistance to endure heat caused by spray coating (2) Elasticity preventing a masking pin from coming out of a cooling hole when vibration due to blasting treatment acts on the pin after it is inserted into the cooling hole (3) Stripping easiness to be taken out of a cooling hole after a thermal barrier coating is formed and not to be seized in the cooling hole (4) Wetness (inferior wetness) to repel thermal barrier coating material to prevent it from laying By experimenting to verify a material having the above-mentioned properties (1) through (4), it is found out that a masking pin which is made of an elastic body of liquid silicone rubber (silicone gasket) by drying and hardening or a masking pin which is made by punching out of sheets of an elastic body of silicone rubber with a mold is optimum.

Giving concrete examples, it is found out that Three Bond Co.'s Type 1207F is an optimum elastic body of liquid silicone rubber (silicone gasket) which mainly consists of Si and O and whose maximum heat resistance is 250° C. and that Three Bond Co.'s sheet of elastic body of silicone rubber which mainly consists of Si and O and whose maximum heat resistance is 200° C. is an optimum elastic body sheet of silicone rubber.

Some kinds of liquid masking materials adhere to a base metal too closely and are inferior in detaching. In such a case, it is effective to use a separate type of spray of Si or fluorine.

An elastic body of liquid silicone rubber is not limited to Three Bond Co.'s product, but when main constituents are Si and O, such elastic body of liquid silicone rubber can be selected as a material of masking pins because it has the above-mentioned material properties of (1) through (4).

Also, a sheet of an elastic body of silicone rubber is not limited to the above-mentioned Three Bond Co.'s product, but when main constituents are Si and O, such a sheet of an elastic body of silicone rubber can be selected as a material of masking pins because it has the above-mentioned material properties of (1) through (4).

In order to select a masking material, an experiment is carried out by making holes similar to air cooling constructions formed in a combustor transition piece (air passageway slots, air inlet holes, air outlet holes [cooling holes]) in test pieces consisting of the same constituents as a combustor transition piece and inserting various kinds of materials into cooling holes. In experiments, after heating a test sample having materials inserted into cooling holes at the temperature of 200° C. in the air for ten (10) minutes, the materials are taken out to check for the above-mentioned properties of (1) through (4) and after heating a test sample having materials inserted into cooling holes at the temperature of 400° C. in an argon gas environment for one (1) minute, the materials are taken out to check for the aforesaid properties of (1) through (4). These experiments take it into consideration that in spray coating of a combustor transition piece, the base metal of a combustor transition piece is maintained at the temperature of about 200° C. all the time and that the temperature of spray-coating material (temperature of molten particles) reaches 400° C. momentarily.

Dimensions of a masking pin used in the embodiment of the present invention are specified to protrude for an amount of thickness of coating when inserted into a cooling hole in the combustor transition piece, but shrink for about 10% after coating, resulting in the dimension that it does not protrude above the surface (internal periphery surface) of the transition piece (on the contrary, it subsides for a little amount).

An elastic body of liquid silicone rubber is liquid when it is injected into a cooling hole, but as it is dried, it gets hardened by decreasing the volume, and the hardened material becomes a masking pin which is inserted into a cooling hole. However, the injection amount is adjusted so that the masking pin after hardening does not protrude above the surface of a combustor transition piece (internal periphery surface).

Next, an example of a thermal barrier coating method will be described hereinafter, by which a thermal barrier coating is formed on the internal periphery surface of a wall of a combustor transition piece of a gas turbine. A masking pin which is made by drying and hardening of an elastic body of liquid silicone rubber is used in this example.

As shown in FIG. 1A, an air passageway slot 21 is formed inside a wall 20 constituting a combustor transition piece of a gas turbine. Cooling holes (air outlet holes) 22 leading to the air passageway slot 21 are formed in the internal periphery surface 20in, while air inlet holes (figure omitted) leading to the air passageway slot 21 are made in the external periphery surface 20out. The diameter of cooling holes 22 and that of air inlet holes are larger than the width of the air passageway slot 21. In order to form a thermal barrier coating on the internal periphery surface 20in of the wall, first, apply stripping agents (silicone, fuluorine, etc.) to the cooling hole 22 and to the portion of the air passageway slot 21 facing to the cooling hole 22.

Next, as shown in FIG. 1B, inject an elastic body of liquid silicone rubber 32 into the cooling hole 22 and into the portion of the air passageway slot 21 facing the cooling hole 22 by using a syringe 31. The elastic body of liquid silicone rubber 32 is Three Bond Co.'s Type 1207F elastic body of liquid silicone rubber which has heat resistance for the temperature from 200 to 250° C. Since this elastic body of liquid silicone rubber 32 is liquid/gel, it can be easily injected into the cooling hole 22 and into the portion of the air passageway slot 21 facing to the cooling hole 22. However, the elastic body of liquid silicone rubber 32 has viscosity to some extent, so that it does not penetrate through the portion of the air passageway slot 21 facing to the cooling hole 22 and go deep into internal of the air passageway slot 21.

In this case, injection is carried out until the surface of the injected elastic body of liquid silicone rubber 32 rises over the internal periphery surface 20in. The injection amount will be described later. Also, injection can be done by using a pallet instead of using a syringe 31. Work is easy because all you have to do is injection only.

When the injected elastic body of liquid silicone rubber 32 is left, it is dried up and hardened. At the same time, it is subject to volumetric shrinkage. By being dried and hardened by volumetric shrinkage, the injected elastic body of liquid silicone rubber 32 becomes a masking pin MP2 which is inserted into the cooling hole 22 and the air passageway slot 21. (See FIG. 1C.) In this case, in order not to make the masking pin MP 2 protrude above the internal periphery surface 20in, the injection amount of elastic body of liquid silicone rubber 32 is adjusted in FIG. 1B. Namely, the masking pin MP 2 does not protrude above the surface of the cooling hole 22 of a component. However, depending on material conditions, shrinkage is difficult. In such a case, the surface of the masking pin MP 2 is pressed flat with a hand. In injecting liquid silicone rubber, it is important to supply a specific amount at a specific pressure and it is effective to use a dispenser on the market for injection.

Dimensions of the cooling hole 22 and the air passageway slot 21 are not uniform but dispersed. However, since the masking pin MP 2 is dried and hardened elastic body of liquid silicone rubber 32 which is injected into the cooling hole 22 and the air passageway 21, it is inserted closely into the cooling hole 22 and the air passageway slot 21.

When the masking pin MP 2 is inserted by drying and hardening the elastic body of liquid silicone rubber 32, as shown in FIG. 1D, blast treatment is carried out for the internal periphery surface 20in by blasting alumina ($Al_2O_3$) to coarsen the surface. At this time, since the masking pin MP 2 has elasticity, an anchoring effect given by blast treatment does not work and even though an impact acts, the masking pin MP 2 will not fall out of the cooling hole 22.

After blast treatment is completed, as shown in FIG. 1E, form a surface metal layer (under coat) 41 by spray coating of MCrAlY over the internal periphery surface 20in. At this time, since the masking pin MP 2 is inferior in wetness, metal particles spray-coated over the masking pin MP 2 are repelled and MCrAlY spray-coating metal scarcely accumulates on the masking pin MP 2. Also, in case of a little amount of accumulation, it is possible to remove them completely by air blowing and polishing with an emery paper.

After the surface metal layer 41 is formed completely, as shown in FIG. 1F, spray coat the ceramic materials mainly consisting of zirconia over the surface metal layer 41 to form a thermal barrier layer (top coat) 42. At this time, since the masking pin MP 2 is inferior in wetness, spray-coating metals sprayed over the masking pin MP 2 are repelled and the ceramic spray-coating metals are scarcely accumulated on the masking pin MP 2. Also, in case of a small amount of accumulation, it is possible to remove it by air blowing and polishing with an emery paper.

Since the masking pin MP 2 does not protrude above the internal periphery surface 20in, spray coating of MCrAlY or ceramic materials does not shadow the protruded portion, but spray coating is possible for all over the surface where necessary. In other words, a portion where ceramic materials are not spray-coated does not occur around the internal periphery surface 20in due to shadowing of the portion protruding above the internal periphery surface 20in. When a portion which is not spray-coated due to shadowing occurs, it is possible that the surface of a base metal is exposed, resulting in an initial cracking due to a long-time use. However, a portion where ceramic materials are not spray-coated due to shadowing by spray coating does not occur around the internal periphery surface 20in, heat resistance and durability are more superior.

Additionally, the masking pin MP 2 has heat resistance. Therefore, the masking pin MP 2 is not burned and scorched or melted when MCrAlY or ceramic materials are spray-coated.

When a thermal barrier layer 42 is formed completely, hook the masking pin MP 2 with a needle or a pin to take out of a cooling hole 22. Since the masking pin MP 2 has a stripping ability that it is not seized in the cooling hole 22, masking material does not remain in the cooling hole 22 or air passageway slot 21, but the entire masking pin MP 2 can be taken out thoroughly without any damage. (See FIG. 1G.) Removal work is easy because it is possible to take out the masking pin MP 2 with a needle or a pin.

In this way, a thermal barrier coating (a surface metal layer 41 and a thermal barrier layer 42) is provided to the internal periphery surface 20in of the wall constituting a combustor transition piece. Additionally, a thermal barrier coating can be supplied to all necessary surfaces. As a result, a combustor transition piece is protected from heat by the thermal barrier coating, which prevents generation of cracking due to temperature increase or damages, thus enabling the production of combustor transition pieces of high reliability.

Masking work consists of the injection of an elastic body of liquid silicone rubber 32 and hooking the masking pin MP 2 with a needle for removal only, so that it is relatively easy work. Desirable tools for removal are a needle with a burr and a packing tool for removal of a gland packing. Use of SAN-EI TECH's dispenser makes it possible to inject a specific amount at a specific pressure.

Next, another example of a method of a thermal barrier coating supplied to the internal periphery surface (surface on the inside diameter) of a wall constituting a combustor transition piece of a gas turbine will be described hereinafter. In this example, a masking pin is used, which is formed by punching out of sheets of an elastic body of silicone rubber with a mold. In this case, punching-out only makes the longitudinal sectional configuration trapezoid. Therefore, just before completion of punching out and cutting off, a cutter blade is rotated. Also, in order to produce masking pins of good quality in mass, there is a forming method using a metal mold.

Figure 2B:
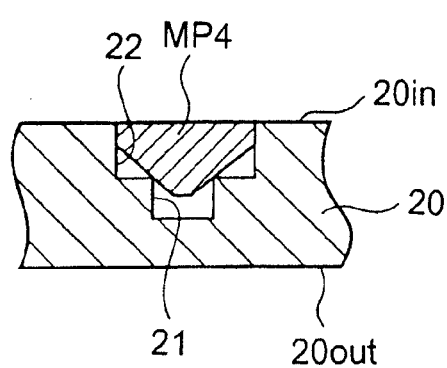
Figure 3:
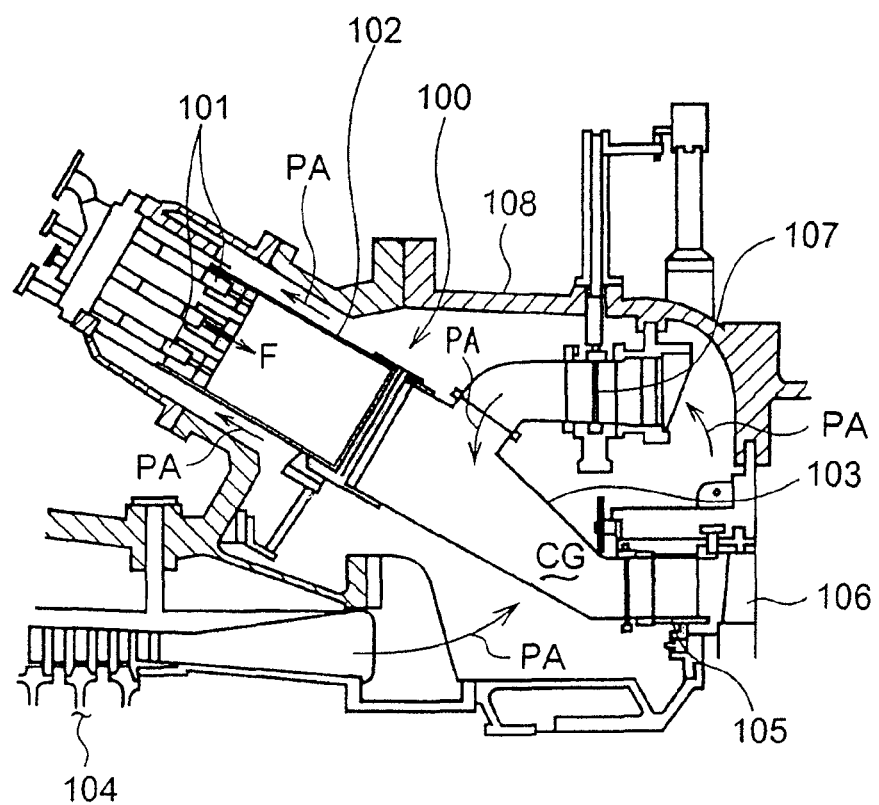
FIG. 3 is a schematic drawing showing an arrangement of a combustor of a gas turbine.
Figure 4:
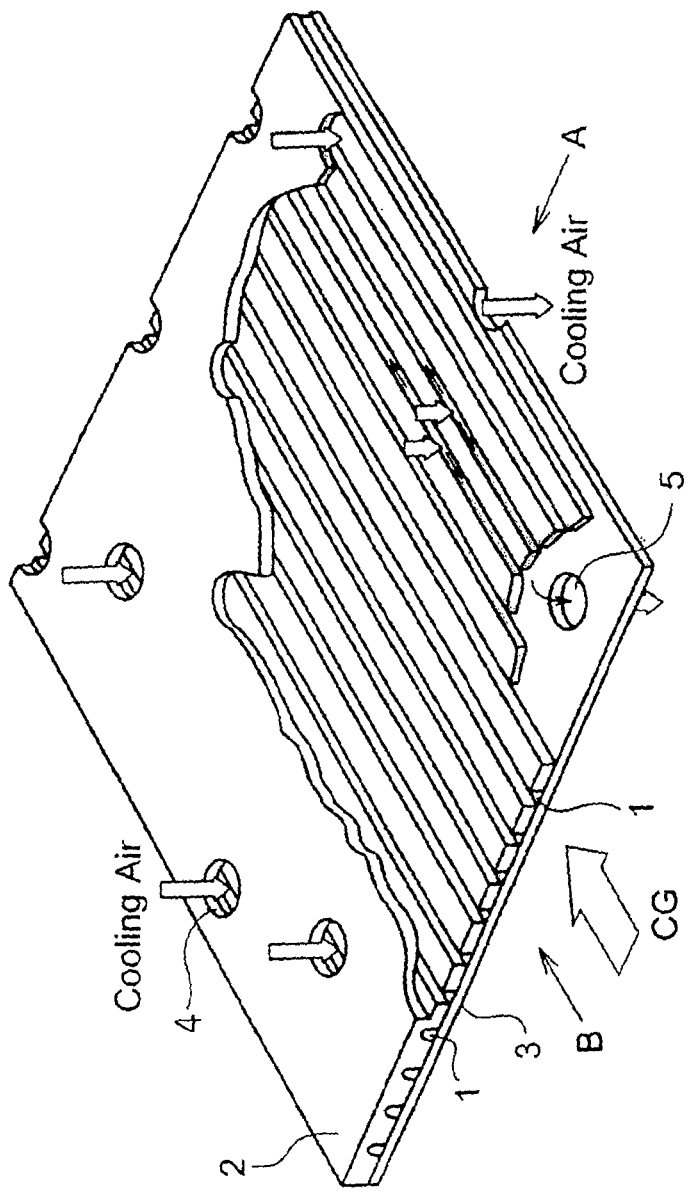
FIG. 4 is a cut-away view showing a part of wall forming a combustor transition piece.
Figure 5:
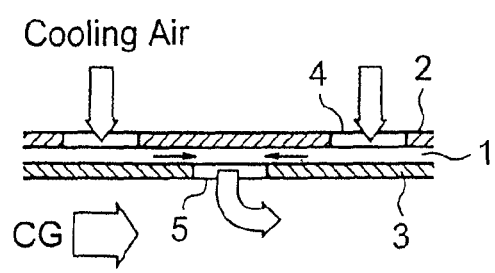
FIG. 5 is a sectional view of FIG. 4 viewed from direction A.
Figure 6:
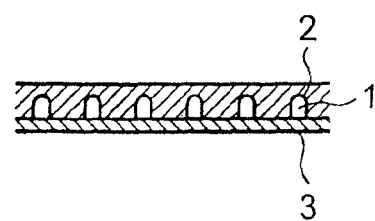
FIG. 6 is a sectional view of FIG. 4 viewed from direction B.
Figure 7:
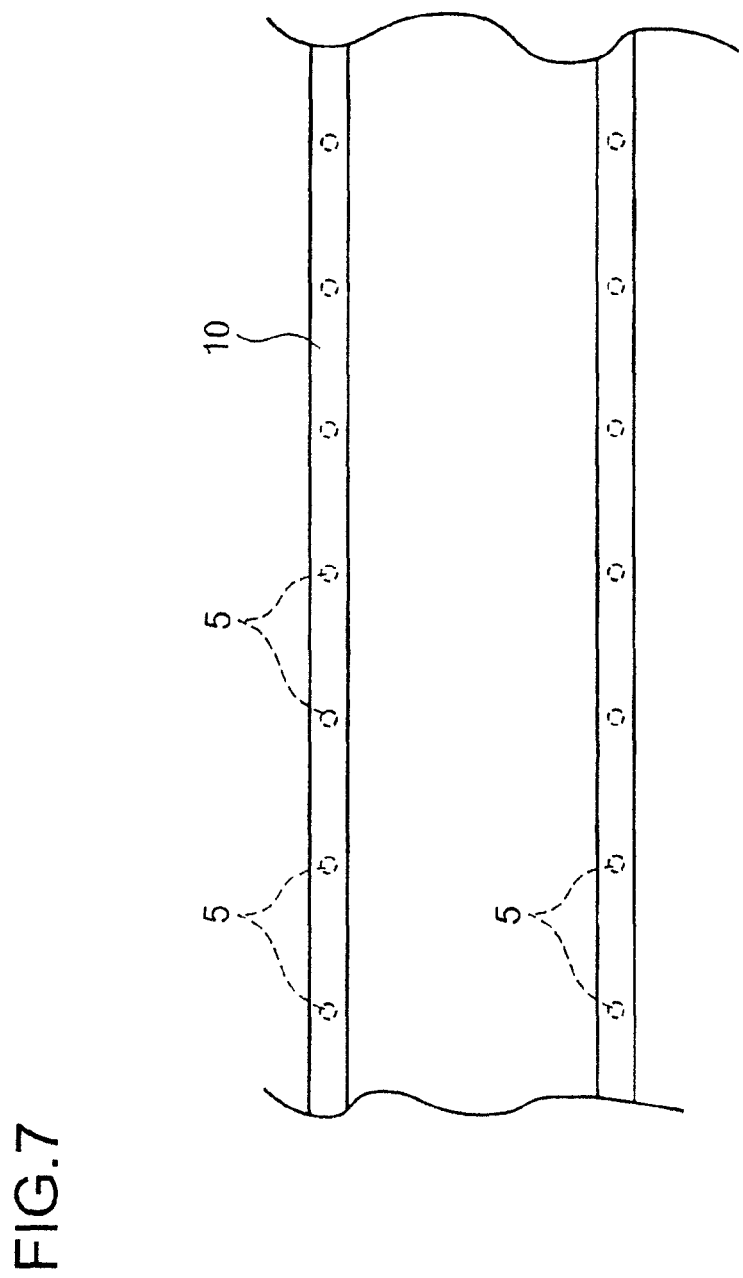
FIG. 7 is a plane view showing the internal periphery surface of a combustor transition piece masked with a masking tape.
Figure 8:
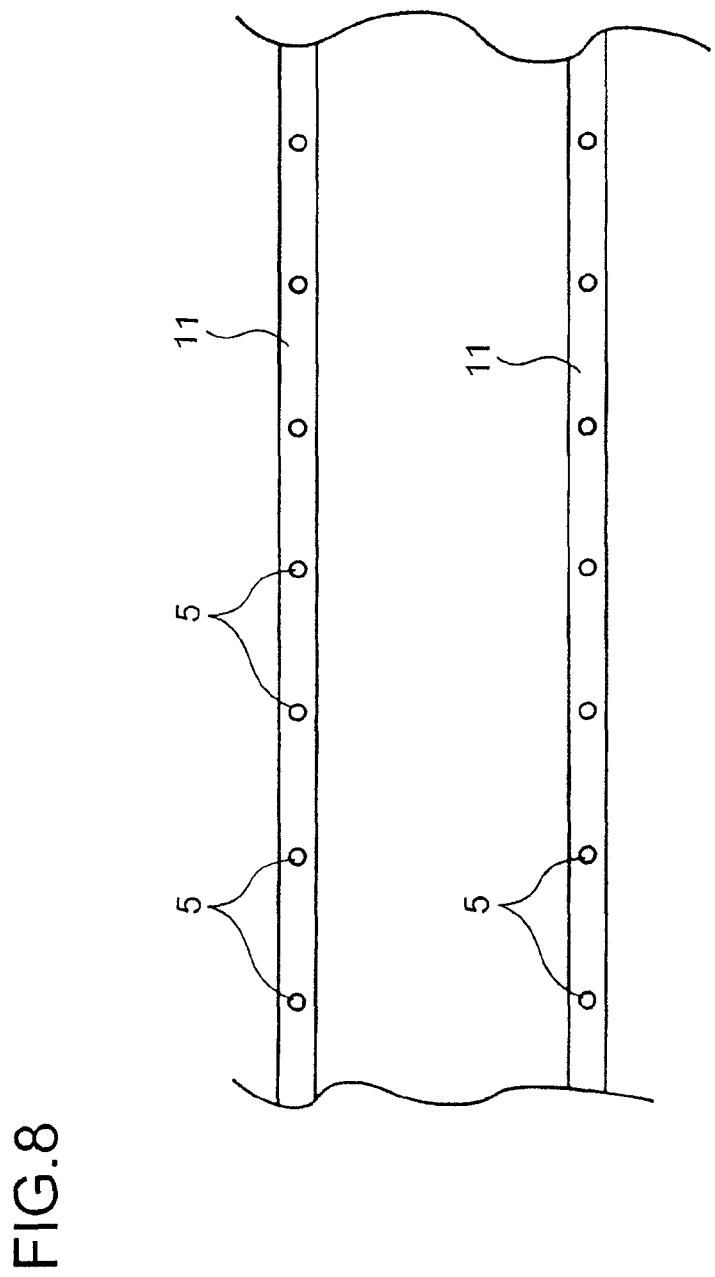
FIG. 8 is a plane view, showing the internal periphery surface of a combustor transition piece from which a masking tape is removed.
Figure 9:
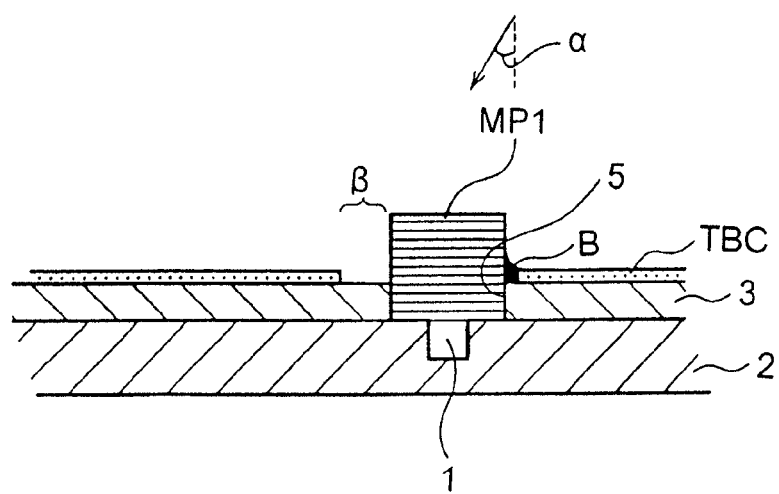
FIG. 9 is a sectional view showing a transition piece with conventional masking pins inserted.

In this method, as shown in FIG. 2A, a masking pin MP 3 whose sectional configuration is a flat plate or a footed type is inserted into the cooling hole 22 and into a portion of the air passageway slot 21 facing the cooling hole 22. Otherwise, as shown in FIG. 2B, a masking pin MP 4 whose sectional figure is tapered is inserted into the cooling hole 22 and into a portion of the air passageway slot 21 facing the cooling hole 22. In these cases, the masking pins MP 3 and MP 4 are specified to have dimensions so as not to protrude above the internal periphery surface 20in of a wall 20.

An outline figure of the masking pin MP 3 is obtained by punching out sheets of the elastic body of silicone rubber with a mold in a manner that it coincides with the shape of a space of the cooling hole 22 and that of a space of a portion of the air passageway slot 21 facing the cooling hole 22. The size of the pin is enlarged for 5% to 10% larger than the hole diameter to increase tension and enhance blasting resistance. In this case, since pins larger than the hole size are to be inserted, it takes time to insert a large number of pins as well as insertion conditions are not uniform. Therefore, it is effective to use a tool (syringe) which press-fits pins with compressed air or a piston. Also, sheets of elastic body of silicone rubber are punched out with a mold to form a masking pin MP 4 in a manner that the radius of the masking pin MP 4 complies with the radius of the cooling hole 22 and that of the portion of the air passageway slot 21 facing the cooing hole 22.

Since these masking pins MP 3 and MP 4 have elasticity, they are fit to and inserted into the cooling holes 22 and the air passageway slots due to elasticity even though the size of the cooling holes 22 and the air passageway slots 21 are not uniform.

In this way, after the masking pins MP 3 or masking pins MP 4 are inserted into the cooling holes 22, surfaces are coarsened by blasting treatment in the same way as shown in FIG. 1D, a surface metal layer is formed by spray coating as shown in FIG. 1E and a thermal barrier layer is formed by spray coating in the same manner as shown in FIG. 1F. After that, hook the masking pins MP 3 and the masking pins MP 4 with a removal tool to take them out. In this case, there is a possibility that the end face of coating surrounding a masking pin might be partially lost when the masking pin is taken out or while a gas turbine is in operation. In order to prevent this loss, chamfer the coating by using a rubber hone, with the masking pin remaining in the hole to prevent cutting particles from entering the hole.

Since the masking pin MP 3 and the masking pin MP 4 have elasticity, they do not come out even though vibration caused by blasting treatment is applied to them. Since they have heat resistance, they are endurable to heat caused by spray coating. Since they are inferior in wetness, thermal barrier coating materials do not accumulate and since they have easily-stripping ability, they can be taken out of holes easily. The masking pin MP 3 and the masking pin MP 4 are sized in a manner that they do not protrude above the internal periphery surface 20in of the wall 20. Therefore, in spray coating, shadows or portions where coating is not provided properly or bridging portions do not occur, but a thermal barrier coating can be formed where necessary.

A thermal barrier coating (a surface metal layer 41 and a thermal barrier layer 42) is supplied to the internal periphery surface 20in of a wall constituting a combustor transition piece in this way. Moreover, a thermal barrier coating is provided to all surfaces of necessary portions. Therefore, the combustor transition piece is protected from heat by a thermal barrier coating as well as given an effect of oxidation resistance by undercoating (metal layer), which prevents cracking due to temperature increase and damages from occurring and make it possible to manufacture combustor transition pieces of high reliability.

With the above-mentioned embodiment, cooling holes which are not drilled through and made in the wall of a combustor transition piece are masked, but recently, small holes for cooling are drilled through from the external periphery surface to the internal periphery surface of the wall of a combustor transition piece. The diameter of these small drilled-through holes is smaller than that of cooling holes, but they are deep for 4 to 5 mm in depth. Therefore, cleaning and retouching are difficult after coating. The masking pins MP 2 through MP 4 with an embodiment of the present invention are applicable to these small drilled-through holes.

From the viewpoint of inserting capability, liquid masking is appropriate for these deep holes of small diameter. However, injection by using a syringe does not allow the liquid masking material to penetrate into the inside due to surface tension but overflows it. Therefore, use of a dispenser which makes it possible to inject a specific amount at a specific pressure can achieve stable injection.

Also, drilled-through holes are formed in blades of a gas turbine for cooling. In order not to clog the drilled-through holes while supplying a thermal barrier coating to the blade surfaces, the masking pins MP 2 through MP 4 in this embodiment are applicable. Additionally, they are also applicable to all components which have a spray-coating layer by using so-called APS method or HVOP method.

The following is another example of a thermal barrier coating method supplied to the internal periphery surface (surface on the inside diameter) of the wall constituting a combustor transition piece of a gas turbine. In this example, masking pins made by the punching out of sheets of an elastic body of silicone rubber with a mold are used in the same manner as the above-mentioned example. Constituents of the masking pins are mainly silicone combined with siloxane. In order to prevent the masking pins from not being taken out, they are colored in red ocher against white coating around them for better visual identification. The coloring agent is composed of iron oxide ($Fe_2O_3$).

Figure 10A:
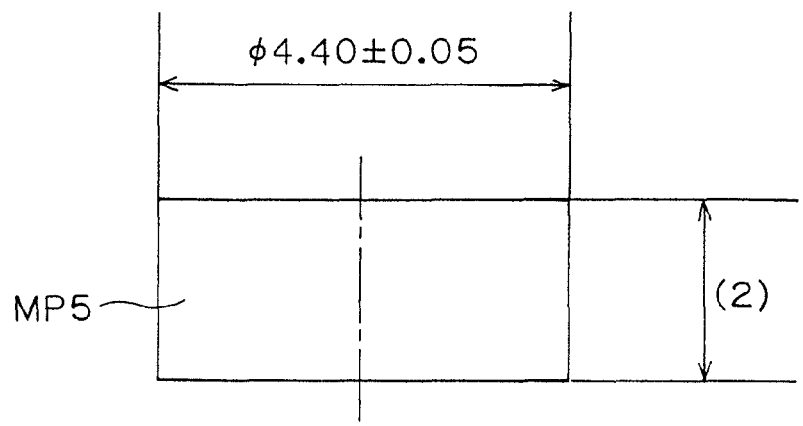
FIGS. 10A and 10B are figures showing the configuration of a disc type of a masking pin. In particular.
Figure 10B:
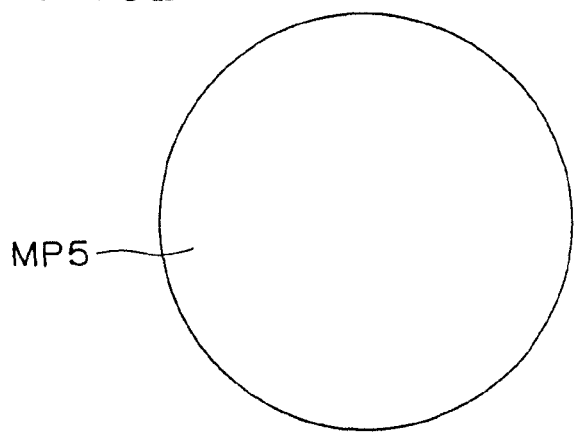

FIG. 10 through FIG. 12 show the configuration of masking pins in these examples. FIG. 10 shows a disc type of a masking pin MP 5. FIG. 10A shows the front view and FIG. 10B shows the bottom view. Utilizing repulsive force of rubber, blasting resistance is enhanced by enlarging the outside diameter to be φ4.40±0.05, giving 10% excess to the diameter of the cooling hole (φ4). Also, it is possible to manufacture a masking pin for the cooling hole whose diameter is φ3. Additionally, the following types of masking pins are available. The above-mentioned enhancement is also made for the following types of masking pins to be described below. Furthermore, an adhesive tape (not indicated in the figures) is attached to the bottom face to enhance masking effect by adhering the masking pin closely to the bottom of the cooling hole. In this case, when the masking pin is tapered with a smaller diameter at the bottom face, it is easy to be inserted into a cooling hole, maintaining blasting resistance.

Figure 11A:
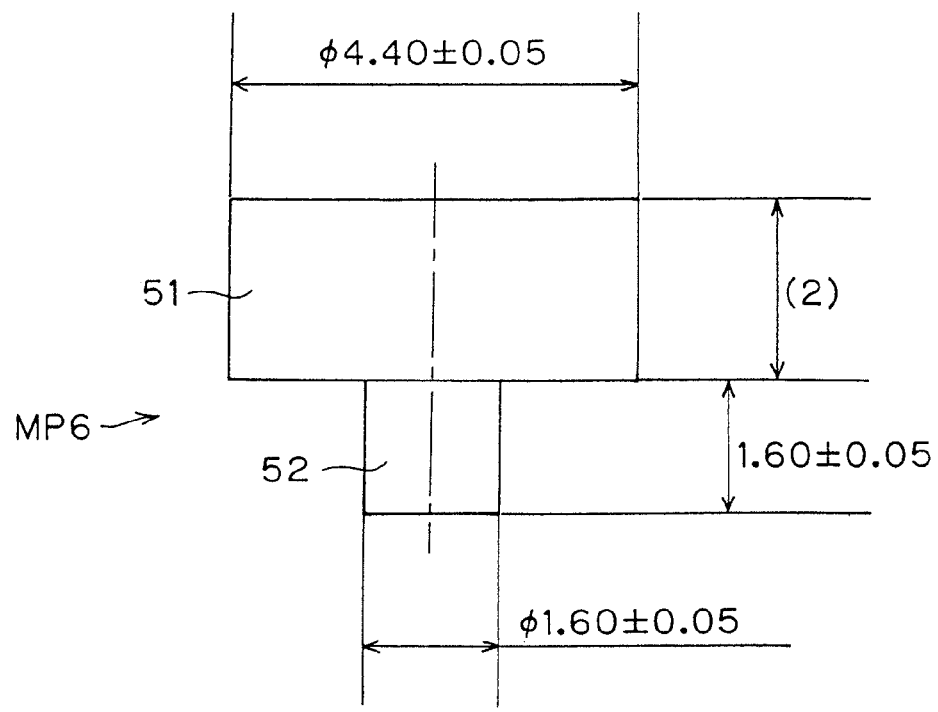
FIGS. 11A and 11B are figures showing the configuration of a disc type of footed masking pin. In particular.
Figure 11B:
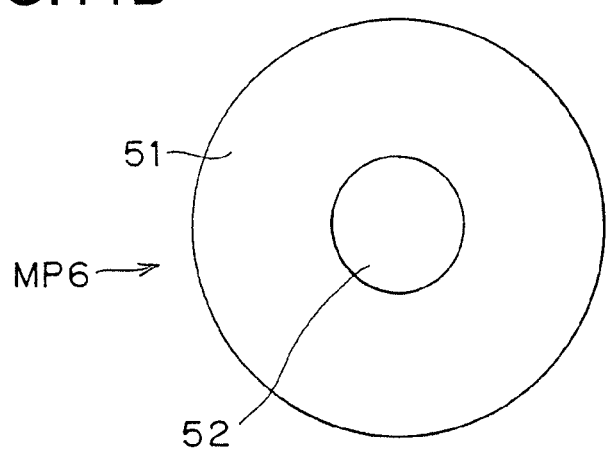

FIG. 11 shows a disc type of footed masking pin MP 6. FIG. 11A shows the front view and FIG. 11B shows the bottom view. Utilizing a repulsive force of rubber, blasting resistance is enhanced by enlarging the outside diameter of the disc body 51 to be φ4.40±0.05 by giving 10% excess to the diameter of the cooling hole (φ4). Additionally, masking effect is enhanced by inserting a cylindrical type of protruding pin 52, which extends from the center of the bottom of the disc body 51, into an air passageway slot under the cooling hole.

Figure 12A:
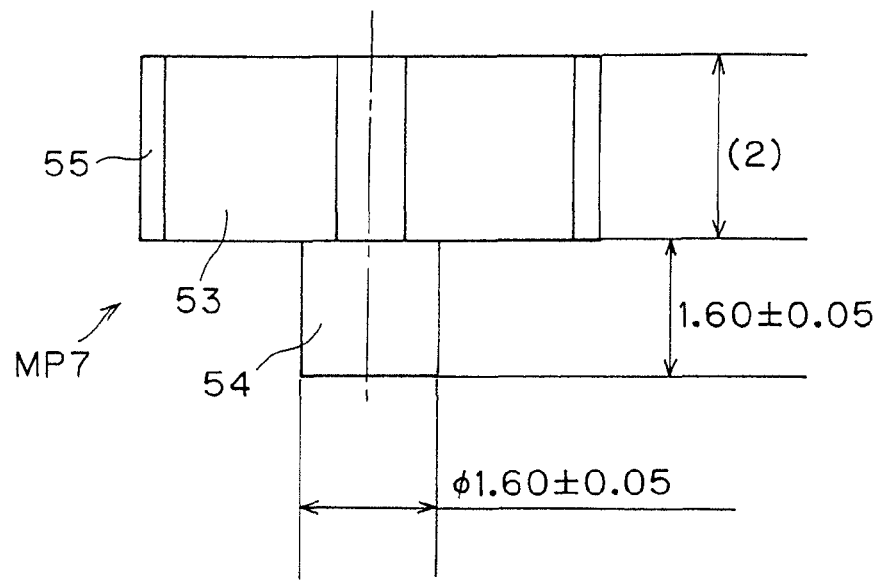
FIGS. 12A and 12B are figures showing the configuration of a disc type of footed masking pin around which protrusions are supplied. In particular.
Figure 12B:
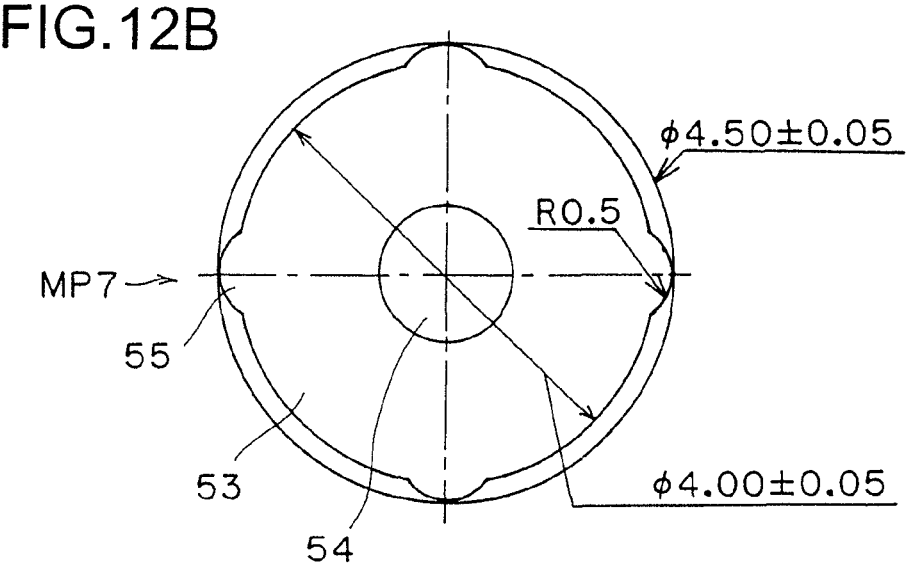

FIG. 12 shows a disc type of footed masking pin MP 7 with protrusions made around it. FIG. 12A shows the front view and FIG. 12B shows the bottom view. The outside diameter of the disc type of body 53 is φ4.00±0.05, which is almost the same as the diameter of a cooling hole (φ4) and there are some protrusions 55 with 0.5 radius around the body. Utilizing the repulsive force of rubber, blasting effect is enhanced by allocating these protrusions to be inscribed to a circle of φ4.50±0.05 and enlarging the diameter to be larger than that of the cooling hole. In addition, masking effect is enhanced by inserting a cylindrical protruding pin 54, which extends from the center of the bottom of the body 53, into an air passageway slot under the cooling hole.

Blasting resistance is effective when rubber hardness of masking pins is 30 to 70 HS (hardness of spring). Especially, productivity, heat resistance and blasting resistance are superior when simple disc type of masking pins have hardness of 50 HS or 70 HS and when disc type of footed masking pins have hardness of 50 HS.

FIG. 13 indicates a thermal barrier coating method of the example in this embodiment. These figures show the above-mentioned masking pin MP 6 as a representative example. In this method, as shown in FIG. 13A, masking pin MP 6 is inserted into a cooling hole 22 and a portion of the air passageway slot 21 facing the cooling hole 22. In this case, the masking pin MP 6 is specified to protrude above the internal periphery surface 20in of the wall 20 for an amount as much as about the thickness of the coating (e.g. 0.4 mm).

Next, as shown in FIG. 13B, the internal periphery surface 20in is blasted to be coarsened by blowing alumina ($Al_2O_3$) to the surface. Since the masking pin MP 6 has elasticity, anchoring effect given by blast treatment does not work and even though an impact acts, the masking pin MP 6 will not fall out of the cooling hole 22.

After blasting treatment is completed, as shown in FIG. 13C, a surface metal layer (undercoat) 41 is formed on the internal periphery surface 20in by spray coating of MCrAlY. At this time, since the masking pin MP 6 is inferior in wetness, metal particles spray-coated over the masking pin MP 6 are repelled. Therefore, spray-coated metal of MCrAlY scarcely lies and accumulates over the masking pin MP 6. Even if there exists a little accumulation, it is possible to remove it completely by blowing with the air and polishing with an emery paper.

After a surface metal layer 41 is formed, as shown in FIG. 13D, a thermal barrier layer (topcoat) 42 is formed by spray-coating ceramic materials mainly composed of zirconia. At this time, since the masking pin MP 6 is inferior in wetness, metals spray-coated over the masking pin MP 6 are repelled, so that ceramic materials spray-coated over the masking pin MP 6 scarcely remain and accumulate. In case of a small amount of accumulation, it can be thoroughly removed by blowing the air and polishing with an emery paper.

Due to heat during coating, the masking pin MP 6 shrinks for about 10%. Therefore, for example, it sinks below the top surface of the coating for about 0.2 mm and it is easy to retouch and chamfer the circumference of the hole. Otherwise, the protruding amount of the masking pin before shrinkage may be specified in advance in a manner that the protruding amount is equal to or less than the thickness of a thermal barrier coating after the masking pin MP 6 shrinks due to heat during coating practices.

After a thermal barrier layer 42 is formed, remove most of the coating accumulated on the masking pin by blowing the air and polish the surrounding area of the masking pin lightly with a diamond paper. Subsequently, as shown in FIG. 13E, chamfer the circumference of the coated hole with a rubber ball (or cylindrical) hone 55 with the outside diameter of 10 mm, containing alumina honing particles. Or, tapered rubber hone can be used.

At this time, the rotating speed of the rubber hone 55 is set as several thousand rpm and chamfering activity is done for about ten seconds. This chamfering activity mitigates a "loss of the coating in the surrounding area" while removing masking pins as well as "exfoliation of the coating during actual operation of a unit." The point is that retouching is performed with the masking pin remaining inserted in the hole. By this condition, grinding remainders of coating do not remain inside the cooling holes. A rubber hone is used because it is soft and easy to fit, so that a loss can be prevented when the coating is started to be ground.

After the area surrounding the coated hole is chamfered, use a pin with a burr (such as a straight fish hook) or a tool for removal of a gland packing to hook the masking pin MP 6 and take it out of the cooling hole 22. Since the masking pin MP 6 has stripping easiness to prevent itself from seizure in the cooling hole 22, the entire masking pin MP 6 can be taken out completely without masking materials remaining in the cooling hole 22 or the air flow passageway slot 21. (See FIG. 13F.) Especially, since the packing removal tool has a spiral needle, by rotating the needle and inserting it into the masking pin MP 6 and then pulling it out, it is easy to remove the masking pin MP 6 in the same manner as pulling out a cork stopper from a wine bottle.

The cooling hole made in the neighborhood of a radiused bending area of the wall is deformed due to bending of sheeting work, so that it is difficult to insert a masking pin which is made by the punching out of sheets of elastic body of silicone rubber. Therefore, it is better to inject an elastic body of liquid silicone rubber into this portion and dry and harden it to form a masking pin. However, injection of the elastic body of liquid silicone rubber is to be done by using a dispenser, which makes it possible to supply a specific amount of rubber at a specific pressure.

The elastic body of liquid silicone rubber (silicone gasket) is mainly categorized into the following two types. One is one component RTV silicone rubber, which includes deaceton type, deoxime type and dealcohol type. Each of these types generates elimination reaction by reacting to moisture in the air and gets hardened, forming silicone rubber. Hardening speed depends on the temperature and humidity of the air and contact with the air and takes approximately 10 to 15 hours. Also, it is necessary to remove eliminated substance by ventilation. The other type is two components RTV silicone rubber which is formed by mixing a curing agent and a main agent and causing hardening reaction. Compared with one component RTV silicone rubber, it is possible to harden deeper portion although its workability is inferior.

In this way, it is possible to form a thermal barrier coating (a surface metal layer 41 and a thermal barrier layer 42) on the internal periphery surface 20in of a wall constituting a combustor transition piece. Moreover, thermal barrier coating can be supplied to all necessary surfaces. As a result, protected from heat by a thermal barrier coating, the combustor transition piece is not subject to cracking or damages due to increase in temperature, thus resulting in production of a combustor transition piece of high reliability.

While there have been described herein what are to be considered preferred embodiments of the present invention, various decorations and deformations to the present invention are possible to be practiced, provided all such modifications fall in the spirit and scope of invention.

INDUSTRIAL APPLICABILITY

As described above with embodiments of the present invention, the thermal barrier coating method of the present invention is a method of forming a thermal barrier coating by spray coating over the surface of a component which has cooling holes and the thermal barrier coating is formed by spray coating after masking pins which do not protrude above the surface of the component are inserted into the cooling holes Since masking pins do not protrude above the surface of a component in this way, the masking pins make no shadow while spray coating, thus generating no portion where a thermal barrier coating is not formed because of a shadow, but a thermal barrier coating is formed all over the surface of the component. As a result, it is possible to make the component have superior heat resistance and durability. Also, insertion of masking pins prevents the cooling holes from being clogged by a thermal barrier coating.

The thermal barrier coating method in accordance with the present invention is a method to form a thermal barrier coating by spray coating over the surface of a component where cooling holes are made, including a masking process where masking pins, which do not protrude above the surface of the component, are inserted into the cooling holes; a blasting treatment process where the component has its surface blasted and coarsened; and a thermal barrier coating forming process where a thermal barrier coating is formed by spray coating over the surface of the coarsened component.

In this way, since masking is executed before the blasting treatment process, the coarsened surface is not bothered by the blasting treatment, but a fine thermal barrier coating is formed. Additionally, since masking pins do not protrude above the surface of the component, the masking pins do not shadow the surface while spray coating and a thermal barrier coating is formed all over the surface of the component. Furthermore, insertion of masking pins prevents a thermal barrier coating from clogging the cooling holes.

The thermal barrier coating method in accordance with the present invention is a method forming a thermal barrier coating by spray coating over the surface of a component where cooling holes are made and the thermal barrier coating is formed by spray coating after masking pins protruding above the surface of the component for an amount equal to the thickness of the thermal barrier coating are inserted into the cooling holes.

Otherwise, it is a thermal barrier coating method with which a thermal barrier coating is formed by spray coating over the surface of a component where cooling holes are made. In this method that after masking pins protruding above the surface of the component are inserted into the cooling holes, a thermal barrier coating is formed by spray coating, an amount of protrusion of the masking pins is equal to or less than the thickness of the thermal barrier coating after the masking pins are shrunk by heat of spray coating.

At this time, masking pins get shrunk for about 10% due to heat during thermal barrier coating practices and sink a little below the top surface of the thermal barrier coating, and consequently, retouching and chamfering of the surrounding areas of the holes become easier. Also, insertion of masking pins prevents the thermal barrier coating from clogging the cooling holes.

The thermal barrier coating method in accordance with the present invention is a method of forming a thermal barrier coating by spray coating over the surface of a component where cooling holes are made, including a masking process where masking pins protruding above the surface of the component for an amount almost equal to the thickness of the thermal barrier coating are inserted into the cooling holes; a blasting treatment process where the surface of the component is blasted and coarsened; a thermal barrier coating forming process where a thermal barrier coating is formed by spray coating over the surface of the coarsened component; and a chamfering process where the thermal barrier coating around the cooling holes is chamfered.

Or, it is a thermal barrier coating method by spray coating over the surface of a component where cooling holes are made, including a masking process where masking pins, which protrude above the surface of the component but get shrunk by heat during spray coating in a manner that the protrusion amount will be equal to or less than the thickness of a thermal barrier coating, are inserted into the cooling holes; a blasting treatment process where the surface of the component is blasted and coarsened; a thermal barrier coating forming process where a thermal barrier coating is formed by spray coating over the surface of the coarsened component; and a chamfering process where a thermal barrier coating around the cooling holes is chamfered.

In this way, since masking is carried out before the blasting process, the blasting treatment does not bother the coarsened surface but form a satisfactory thermal barrier coating. Additionally, a masking pin gets shrunk for about 10% due to heat during the thermal barrier coating practices, it sinks a little below the top surface of the thermal barrier coating, and as a result, retouching and chambering around the holes become easy. Furthermore, insertion of masking pins prevent the thermal barrier coating from clogging the cooling holes.

In addition, in the thermal barrier coating method in accordance with the present invention, the cooling holes are not drilled through or drilled through; the component means a combustor transition piece of a gas turbine; and the cooling holes are made on the internal periphery surface of a wall constituting the combustor transition piece. As a result, a thermal barrier coating can be formed satisfactorily all over the surface of the internal periphery surface of a combustor transition piece without clogging the cooling holes which are drilled through or not drilled through.

In the thermal barrier coating method in accordance with the present invention, the masking pin is composed of a material which has elasticity to be superior in blasting resistance, heat resistance to endure heat caused by spray heating, stripping easiness to be taken out of the cooling holes after a thermal barrier coating is formed, superior adhering ability and wetness which prevents the thermal barrier coating material from accumulation. The masking pin is composed of an elastic body of silicone rubber or a dried and hardened elastic body of liquid silicone rubber which is injected into the cooling holes or it is composed by punching out of sheets of elastic body of silicone rubber with a mold. Therefore, a satisfactory thermal barrier coating can be formed without the masking pins burned and scorched, slipping out or seized.

The masking pin in accordance with the present invention is composed of a material having elasticity to be superior in blasting resistance, heat resistance to endure heat caused by spray coating, stripping easiness to be taken out entirely from the cooing holes after a thermal barrier coating is formed, superior adherence and wetness to prevent a thermal barrier coating material from accumulation. The masking pin is formed by drying and hardening an elastic body of liquid silicone rubber which is injected into the cooling holes or by punching out of sheets of elastic body of silicone rubber with a mold. As a result, a satisfactory thermal barrier coating is formed without the masking pins burned and scorched, slipping out or seized. The outside diameter of the masking pin is larger than that of the cooling hole by 10 percent, which increases tension and enhances blasting resistance.

Since the combustor transition piece in accordance with the present invention has a thermal barrier coating formed on the internal periphery surface by using the above-mentioned thermal barrier coating method, cracking due to increase in metal temperature or damages do not occur but performance of the product is enhanced.

What is claimed is:

1. A method for forming a thermal barrier coating on a surface of a component having cooling holes, said method comprising:
    arranging masking pins in the cooling holes;
    blasting the surface of the component so as to coarsen the surface of the component in a state in which the masking pins are arranged in the cooling holes;
    forming the thermal barrier coating on the surface of the coarsened component by spray coating molten particles after said arranging of the masking pins and said blasting of the surface of the component; and
    chamfering the thermal barrier coating around the cooling holes in a state where the masking pins remain in the cooling holes after said forming of the thermal barrier coating,
    wherein the masking pins protrude above the surface of the component, and a protrusion amount of the masking pins is equal to a thickness of the thermal barrier coating,
    wherein the masking pins are made by punching out sheets of an elastic body of a silicone rubber or by forming with a metal mold,
    wherein the masking pins are not connected with each other,
    wherein said arranging of the masking pins comprises inserting the masking pins into the cooling holes,
    wherein the masking pin is a footed masking pin including a disc body and a cylindrical protruding pin which extends from the center of a bottom of the disc body, and
    wherein the diameter of the disc body is enlarged to be 5% to 10% larger than the diameter of the cooling hole.

2. The method according to claim 1,
    wherein the cooling holes extend into the component from the surface of the component without passing entirely through the component.

3. The method according to claim 1,
    wherein the component is a combustor transition piece of a gas turbine, and the cooling holes are made in an internal periphery surface of a wall constituting the combustor transition piece.

4. The method according to claim 1,
    wherein the masking pins are comprised of a material having elasticity so as to be resistant to blasting, heat resistance so as to endure heat caused by the spray coating, stripping easiness so as to be entirely removable from the cooling holes after said forming of the thermal barrier coating, and adherence and wetness so as to prevent a thermal barrier coating material from accumulating on the masking pins.

5. The method according to claim 1, wherein the masking pin is colored in a visually identified color against a color of the thermal barrier coating around the masking pin.

6. A method for forming a thermal barrier coating on a surface of a component having cooling holes, said method comprising:
    arranging masking pins in the cooling holes;
    blasting the surface of the component so as to coarsen the surface of the component in a state in which the masking pins are arranged in the cooling holes;
    forming the thermal barrier coating on the surface of the coarsened component by spray coating molten particles; and
    chamfering the thermal barrier coating around the cooling holes in a state where the masking pins remain in the cooling holes after said forming of the thermal barrier coating,
    wherein the masking pins protrude above the surface of the component, and a protrusion amount of the masking pins is equal to or less than a thickness of the thermal barrier coating after the spray coating,
    wherein the masking pins are made by punching out sheets of an elastic body of a silicone rubber or by forming with a metal mold,
    wherein the masking pins are not connected with each other,
    wherein said arranging of the masking pins comprises inserting the masking pins into the cooling holes,
    wherein the masking pin is a footed masking pin including a disc body and a cylindrical protruding pin which extends from the center of a bottom of the disc body, and
    wherein the diameter of the disc body is enlarged to be 5% to 10% larger than the diameter of the cooling hole.

7. The method according to claim 6,
wherein the cooling holes extend into the component from the surface of the component without passing entirely through the component.

8. The method according to claim 6,
wherein the component is a combustor transition piece of a gas turbine, and the cooling holes are made in an internal periphery surface of a wall constituting the combustor transition piece.

9. The method according to claim 6,
wherein the masking pins are comprised of a material having elasticity so as to be resistant to blasting, heat resistance so as to endure heat caused by the spray coating, stripping easiness so as to be entirely removable from the cooling holes after said forming of the thermal barrier coating, and adherence and wetness so as to prevent a thermal barrier coating material from accumulating on the masking pins.

10. The method according to claim 6, wherein the masking pin is colored in a visually identified color against a color of the thermal barrier coating around the masking pin.

11. A method for forming a thermal barrier coating on a surface of a component having cooling holes, said method comprising:
arranging masking pins in the cooling holes;
blasting the surface of the component so as to coarsen the surface of the component in a state in which the masking pins are arranged in the cooling holes;
forming the thermal barrier coating on the surface of the coarsened component by spray coating molten particles after said arranging of the masking pins and said blasting of the surface of the component; and
chamfering the thermal barrier coating around the cooling holes in a state where the masking pins remain in the cooling holes after said forming of the thermal barrier coating,
wherein the masking pins protrude above the surface of the component, and a protrusion amount of the masking pins is equal to a thickness of the thermal barrier coating,
wherein the masking pins are made by punching out sheets of an elastic body of a silicone rubber or by forming with a metal mold,
wherein the masking pins are not connected with each other,
wherein said arranging of the masking pins comprises inserting the masking pins into the cooling holes,
wherein the masking pin is a footed masking pin including a disc body and a cylindrical protruding pin which extends from the center of a bottom of the disc body, and
wherein an outside diameter of the disc body of the masking pin is substantially similar to a diameter of the cooling hole, protrusions are disposed around the disc body, and diameters of the protrusions are larger than the diameter of the cooling hole.

12. A method for forming a thermal barrier coating on a surface of a component having cooling holes, said method comprising:
arranging masking pins in the cooling holes;
blasting the surface of the component so as to coarsen the surface of the component in a state in which the masking pins are arranged in the cooling holes;
forming the thermal barrier coating on the surface of the coarsened component by spray coating molten particles; and
chamfering the thermal barrier coating around the cooling holes in a state where the masking pins remain in the cooling holes after said forming of the thermal barrier coating,
wherein the masking pins protrude above the surface of the component, and a protrusion amount of the masking pins is equal to or less than a thickness of the thermal barrier coating after the spray coating,
wherein the masking pins are made by punching out sheets of an elastic body of a silicone rubber or by forming with a metal mold,
wherein the masking pins are not connected with each other,
wherein said arranging of the masking pins comprises inserting the masking pins into the cooling holes,
wherein the masking pin is a footed masking pin including a disc body and a cylindrical protruding pin which extends from the center of a bottom of the disc body, and
wherein an outside diameter of the disc body of the masking pin is substantially similar to a diameter of the cooling hole, protrusions are disposed around the disc body, and diameters of the protrusions are larger than the diameter of the cooling hole.

* * * * *